US009244522B2

(12) United States Patent
Yang et al.

(10) Patent No.: US 9,244,522 B2
(45) Date of Patent: Jan. 26, 2016

(54) GUIDED BROWSING EXPERIENCE

(71) Applicant: LinkedIn Corporation, Mountain View, CA (US)

(72) Inventors: Angela Yoonjeong Yang, San Francisco, CA (US); Xiaowen Zhang, San Francisco, CA (US); Stephane Dahan, San Jose, CA (US); Chanh Nguyen, Sunnyvale, CA (US); Lawrence Yuan, Campbell, CA (US)

(73) Assignee: LinkedIn Corporation, Mountain View, CA (US)

( * ) Notice: Subject to any disclaimer, the term of this patent is extended or adjusted under 35 U.S.C. 154(b) by 3 days.

(21) Appl. No.: 14/018,970

(22) Filed: Sep. 5, 2013

(65) Prior Publication Data

US 2015/0067502 A1 Mar. 5, 2015

Related U.S. Application Data

(60) Provisional application No. 61/872,558, filed on Aug. 30, 2013.

(51) Int. Cl.
*G06F 17/30* (2006.01)
*G06F 3/01* (2006.01)

(52) U.S. Cl.
CPC ........................................ *G06F 3/01* (2013.01)

(58) Field of Classification Search
CPC .......... G06F 17/30867; G06F 17/3064; G06F 17/30528
USPC .......................................... 715/708, 738, 745
See application file for complete search history.

(56) References Cited

U.S. PATENT DOCUMENTS

| 6,957,390 | B2* | 10/2005 | Tamir | G06F 11/3438 707/E17.108 |
| 7,054,900 | B1* | 5/2006 | Goldston | G06Q 30/02 709/203 |
| 7,203,909 | B1* | 4/2007 | Horvitz | G06F 17/30867 707/E17.109 |
| 7,747,749 | B1* | 6/2010 | Erikson | G06F 17/30902 709/219 |
| 7,900,147 | B2* | 3/2011 | Lei | G06F 17/30902 715/744 |
| 8,073,866 | B2* | 12/2011 | Eagle | G06F 17/30867 707/706 |
| 8,086,625 | B2* | 12/2011 | Lim | G06Q 10/10 705/7.29 |
| 8,359,237 | B2* | 1/2013 | Dalal | G06Q 30/02 705/14.53 |
| 8,468,201 | B2* | 6/2013 | Dasilva | G06F 17/3082 709/203 |
| 8,560,964 | B2* | 10/2013 | Dodson | G06F 17/30899 715/744 |
| 2003/0055762 | A1* | 3/2003 | Holt | G06F 17/30867 705/36 R |
| 2005/0228775 | A1* | 10/2005 | Nilsen | G06Q 30/02 |
| 2007/0150464 | A1* | 6/2007 | Brave | G06F 17/30867 |
| 2007/0288464 | A1* | 12/2007 | Silver | G06Q 50/22 |

(Continued)

*Primary Examiner* — Daeho Song
(74) *Attorney, Agent, or Firm* — Schwegman Lundberg & Woessner, P.A.

(57) ABSTRACT

Methods and systems of providing a guided navigation experience are described. According to various embodiments, a first type of use case may be determined for a first use of a website by a user. The first type of use case may be determined amongst a plurality of types of use cases. A first navigation recommendation may be determined based on the determined first type of use case. The first navigation recommendation may comprise a recommendation for the user to navigate to a first content on the website. The first navigation recommendation may be caused to be displayed to the user. In some embodiments, the plurality of types of use cases may comprise at least one of viewing an update of a profile of another user, viewing an event associated with the profile of another user, performing a job search, and participating in or viewing a discussion.

12 Claims, 12 Drawing Sheets

(56) References Cited

U.S. PATENT DOCUMENTS

| | | | | |
|---|---|---|---|---|
| 2008/0120308 A1* | 5/2008 | Martinez | G06F 17/30035 | |
| 2009/0210806 A1* | 8/2009 | Dodson | G06F 3/0484 | 715/760 |
| 2009/0222735 A1* | 9/2009 | Clark | G06F 17/30876 | 715/738 |
| 2009/0248494 A1* | 10/2009 | Hueter | G06Q 10/00 | 705/7.29 |
| 2009/0307168 A1* | 12/2009 | Bockius | G06F 17/30867 | 706/46 |
| 2010/0122178 A1* | 5/2010 | Konig | G06F 17/30867 | 715/738 |
| 2010/0161631 A1* | 6/2010 | Yu | G06F 17/30011 | 707/758 |
| 2011/0022945 A1* | 1/2011 | Yang | G06F 17/30899 | 715/234 |
| 2011/0191352 A1* | 8/2011 | Jones | G06F 17/30 | 707/749 |
| 2011/0225293 A1* | 9/2011 | Rathod | G06F 17/30867 | 709/224 |
| 2011/0238754 A1* | 9/2011 | Dasilva | G06F 17/3082 | 709/204 |
| 2012/0036260 A1* | 2/2012 | Tiu, Jr. | G06F 17/30867 | 709/224 |
| 2012/0117094 A1* | 5/2012 | Pratt | G06Q 10/06 | 707/758 |
| 2012/0149417 A1* | 6/2012 | Akhtar | G06F 17/30902 | 455/509 |
| 2012/0290950 A1* | 11/2012 | Rapaport | H04L 51/32 | 715/753 |
| 2013/0073400 A1* | 3/2013 | Heath | G06Q 30/02 | 705/14.73 |
| 2013/0097522 A1* | 4/2013 | Devries | G06F 17/30905 | 715/745 |
| 2013/0117675 A1* | 5/2013 | Twig | G06F 17/30867 | 715/737 |
| 2013/0145288 A1* | 6/2013 | Zadeh | H04M 1/72572 | 715/753 |
| 2013/0151539 A1* | 6/2013 | Shi | G06F 17/30867 | 707/754 |
| 2013/0179802 A1* | 7/2013 | Martinazzi | H04L 67/22 | 715/753 |
| 2013/0191399 A1* | 7/2013 | Tocaben | G06F 17/3053 | 707/748 |
| 2013/0282813 A1* | 10/2013 | Lessin | G06Q 10/063 | 709/204 |
| 2014/0129942 A1* | 5/2014 | Rathod | H04N 21/44222 | 715/720 |
| 2014/0298202 A1* | 10/2014 | Cohen | G06F 17/30867 | 715/753 |

* cited by examiner

GUIDED BROWSING EXPERIENCE

CROSS-REFERENCE TO RELATED APPLICATIONS

This application claims priority to U.S. Provisional Application No. 61/872,558, filed on Aug. 30, 2013, and entitled, "GUIDED BROWSING EXPERIENCE," which is hereby incorporated by reference in its entirety as if set forth herein.

TECHNICAL FIELD

The present application relates generally to data processing systems and, in one specific example, to methods and systems of providing a guided browsing experience.

BACKGROUND

Website users are not always presented with content that is relevant to them. It can be unclear as to where they should navigate to next within a particular website. As a result, users may become disenchanted with the experience of browsing the website and leave.

BRIEF DESCRIPTION OF THE DRAWINGS

Some embodiments of the present disclosure are illustrated by way of example and not limitation in the figures of the accompanying drawings, in which like reference numbers indicate similar elements, and in which.

DETAILED DESCRIPTION

Figure 1:
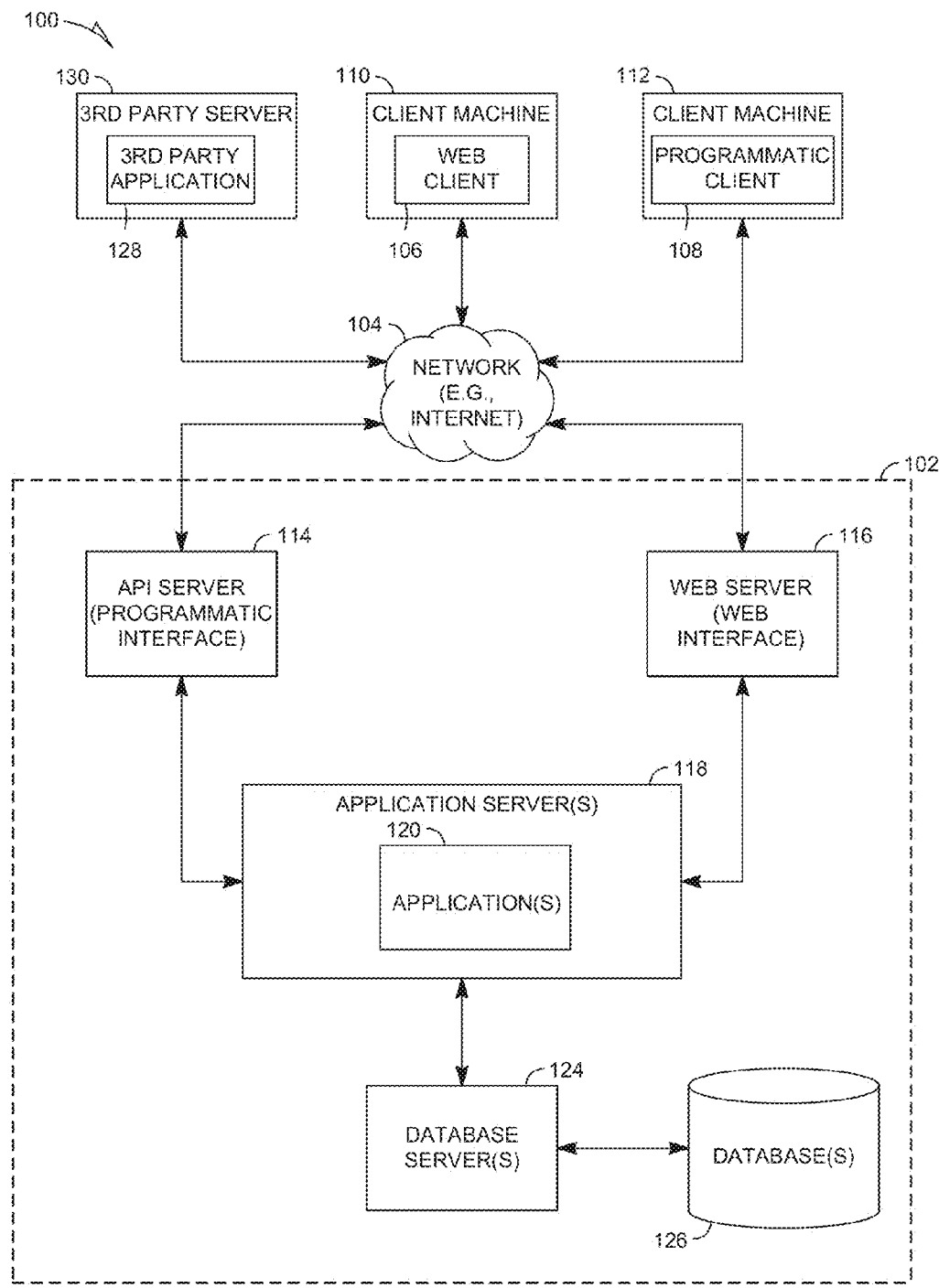
FIG. 1 is a block diagram illustrating a client-server system, in accordance with an example embodiment.

Example methods and systems of providing a guided browsing experience are described. In the following description, for purposes of explanation, numerous specific details are set forth in order to provide a thorough understanding of example embodiments. It will be evident, however, to one skilled in the art that the present embodiments may be practiced without these specific details.

In some embodiments, a site-wide guided browsing experience may be provided, where a user is shown the next relevant page to which to navigate. The next relevant page may be determined based on the current use case being engaged in by the user, profile information of the user, and/or historical behavior data of the user.

In some embodiments, a method may comprise determining a first type of use case for a first use of a website by a user. The first type of use case may be determined amongst a plurality of types of use cases. A first navigation recommendation may be determined based on the determined first type of use case. The first navigation recommendation may comprise a recommendation for the user to navigate to a first content on the website. The first navigation recommendation may then be caused to be displayed to the user.

In some embodiments, the first navigation recommendation may comprise a recommendation for the user to navigate to a first page on the website. In some embodiments, the first page may comprise content corresponding to the first type of use case. In some embodiments, the first page recommendation may comprise a link to the first page on the website.

In some embodiments, determining the first type of use case may comprise detecting a user action on the website, and determining the first type of use case based on the user action. In some embodiments, the user action may comprise at least one of selecting content to view and submitting content.

In some embodiments, the method may further comprise determining a second type of use case for a second use of the website by the user. The second type of use case may be determined amongst the plurality of types of use cases. The second type of use case may be different from the first type of use case. A second navigation recommendation may be determined based on the determined second type of use case. The second navigation recommendation may comprise a recommendation for the user to navigate to a second content on the website. The second navigation recommendation may be caused to be displayed to the user.

In some embodiments, the plurality of types of use cases may comprise at least one of viewing an update of a profile of another user, viewing an event associated with the profile of another user, performing a job search, and participating in or viewing a discussion.

In some embodiments, the determination of the first navigation recommendation may be further based on at least one of profile information of the user, social graph data, and historical behavior data of the user.

In some embodiments, the method may further comprise determining a second navigation recommendation based on at least one of profile information of the user, social graph data, and historical behavior data of the user. The second navigation recommendation may comprise a recommendation for the user to navigate to a second content on the website. The second navigation recommendation may be caused to be displayed to the user.

The methods or embodiments disclosed herein may be implemented as a computer system having one or more modules (e.g., hardware modules or software modules). Such modules may be executed by one or more processors of the computer system. The methods or embodiments disclosed herein may be embodied as instructions stored on a machine-readable medium that, when executed by one or more processors, cause the one or more processors to perform the instructions.

FIG. 1 is a block diagram illustrating a client-server system, in accordance with an example embodiment. A networked system 102 provides server-side functionality via a network 104 (e.g., the Internet or Wide Area Network (WAN)) to one or more clients. FIG. 1 illustrates, for example, a web client 106 (e.g., a browser) and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more applications 120. The application servers 118 are, in turn, shown to be coupled to one or more database servers 124 that facilitate access to one or more databases 126. While the applications 120 are shown in FIG. 1 to form part of the networked system 102, it will be appreciated that, in alternative embodiments, the applications 120 may form part of a service that is separate and distinct from the networked system 102.

Further, while the system 100 shown in FIG. 1 employs a client-server architecture, the present disclosure is of course not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the applications 120 via the programmatic interface provided by the API server 114.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more functions that are supported by the relevant applications of the networked system 102.

In some embodiments, any website referred to herein may comprise online content that may be rendered on a variety of devices, including but not limited to, a desktop personal computer, a laptop, and a mobile device (e.g., a tablet computer, smartphone, etc.). In this respect, the any of these devices may be employed by a user to use the features of the present disclosure. In some embodiments, a user can use a mobile app on a mobile device (any of machines 110, 112, and 130 may be a mobile device) to access and browse online content, such as any of the online content disclosed herein. A mobile server (e.g., API server 114) may communicate with the mobile app and the application server(s) 118 in order to make the features of the present disclosure available on the mobile device.

Figure 2:
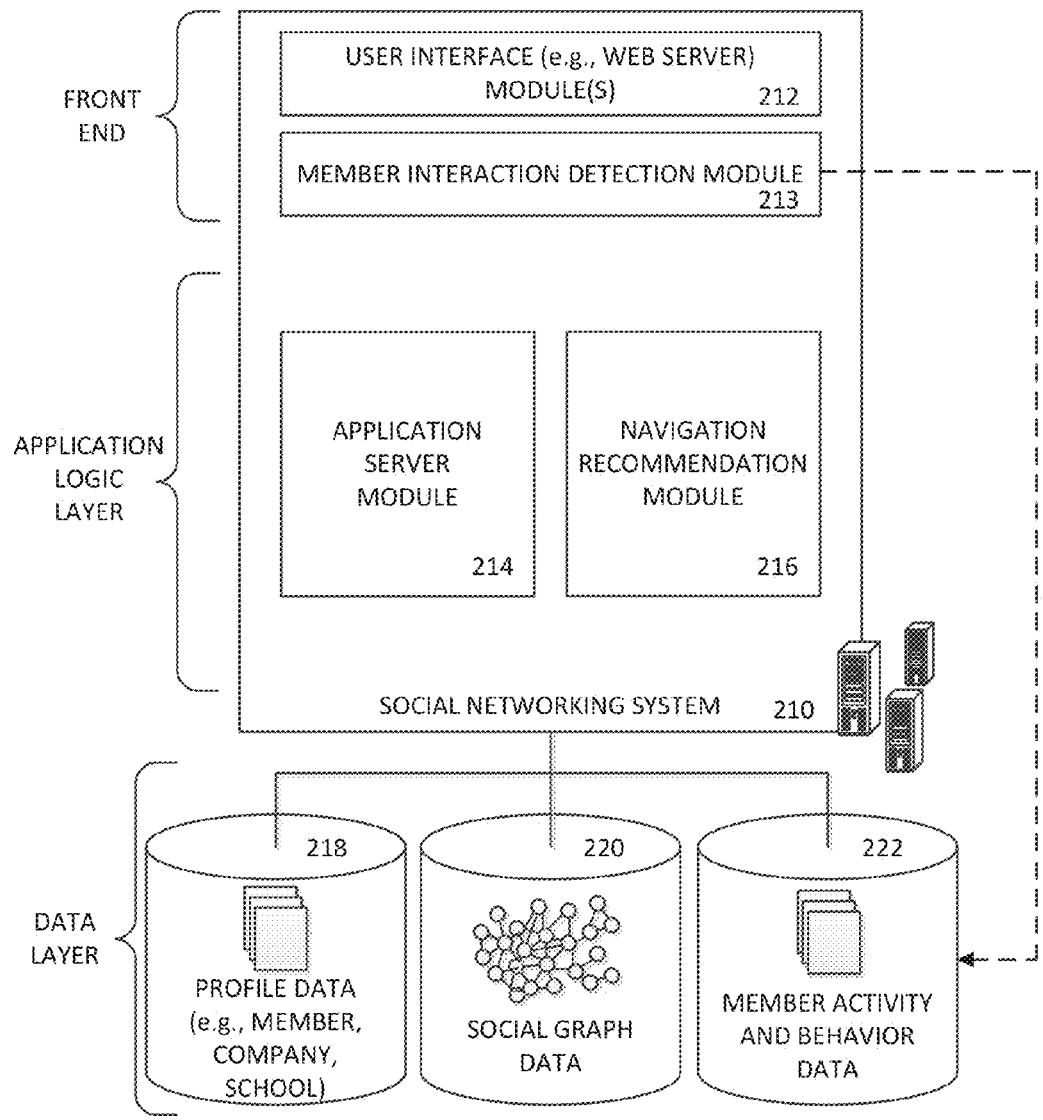
FIG. 2 is a block diagram showing the functional components of a social network service within a networked system, in accordance with an example embodiment.

In some embodiments, the networked system 102 may comprise functional components of a social network service. FIG. 2 is a block diagram showing the functional components of a social networking service, including a data processing module referred to herein as a navigation recommendation module 216, for use in generating and providing navigation recommendations for members of the social networking service, consistent with some embodiments of the present disclosure. In some embodiments, the navigation recommendation module 216 may reside on application server 118 in FIG. 1. However, it is contemplated that other configurations are also within the scope of the present disclosure.

As shown in FIG. 2, a front end may comprise a user interface module (e.g., a web server) 212, which receives requests from various client-computing devices, and communicates appropriate responses to the requesting client devices. For example, the user interface module(s) 212 may receive requests in the form of Hypertext Transport Protocol (HTTP) requests, or other web-based, application programming interface (API) requests. In addition, a member interaction and detection module 213 may be provided to detect various interactions that members have with different applications, services and content presented. As shown in FIG. 2, upon detecting a particular interaction, the detection module 213 logs the interaction, including the type of interaction and any meta-data relating to the interaction, in the activity and behavior database with reference number 222.

An application logic layer may include one or more various application server modules 214, which, in conjunction with the user interface module(s) 212, generate various user interfaces (e.g., web pages) with data retrieved from various data sources in the data layer. With some embodiments, individual application server modules 214 are used to implement the functionality associated with various applications and/or services provided by the social networking service.

As shown in FIG. 2, a data layer may includes several databases, such as a database 218 for storing profile data, including both member profile data as well as profile data for various organizations (e.g., companies, schools, etc.). Consistent with some embodiments, when a person initially registers to become a member of the social networking service, the person will be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the database with reference number 218. Similarly, when a representative of an organization initially registers the organization with the social networking service, the representative may be prompted to provide certain information about the organization. This information may be stored, for example, in the database with reference number 218, or another database (not shown). With some embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. With some embodiments, importing or otherwise accessing data from one or more externally hosted data sources may enhance profile data for both members and organizations. For instance, with companies in particular, financial data may be imported from one or more external data sources, and made part of a company's profile.

Once registered, a member may invite other members, or be invited by other members, to connect via the social networking service. A "connection" may require a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates (e.g., in an activity or content stream) or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed, commonly referred to as an activity stream or content stream. In any case, the various associations and relationships that the members establish with other members, or with other entities and objects, are stored and maintained within a social graph, shown in FIG. 2 with reference number 220.

As members interact with the various applications, services and content made available via the social networking service, the members' interactions and behavior (e.g., content viewed, links or buttons selected, messages responded to, etc.) may be tracked and information concerning the member's activities and behavior may be logged or stored, for example, as indicated in FIG. 2 by the database with reference number 222. This logged activity information may then be used by the navigation recommendation module 216 to determine navigation recommendations for members.

In some embodiments, databases 218, 220, and 222 may be incorporated into database(s) 126 in FIG. 1. However, other configurations are also within the scope of the present disclosure.

As illustrated in FIG. 2, the navigation recommendation module 216 may receive, as input, data from any one or more of the databases 218, 220 and 222, and may determine navigation recommendations. In some embodiments, the navigation recommendation module 216 may be configured to determine a type of use case for a use of a website by a user. The type of use case may be determined amongst a plurality of types of use cases. In some embodiments, a use case comprises a set of possible sequences of interactions between a system and users in a particular environment and related to a particular goal. Examples of use cases for a website may include, but are not limited to, viewing an update of a social networking profile of a user, viewing an event associated with the social networking profile of a user, performing a job search, and participating in or viewing an online discussion. It is contemplated that other types of use cases are also within the scope of the present disclosure.

The navigation recommendation module 216 may be configured to determine one or more navigation recommendations based on the determined type of use case. Each navigation recommendation may comprise a recommendation for the user to navigate to a particular content on the website. The navigation recommendation module 216 may be configured to cause the navigation recommendation(s) to be displayed to the user.

In some embodiments, the navigation recommendation may comprise a recommendation for the user to navigate to a particular page on the website. In some embodiments, the particular page may comprise content corresponding to the determined type of use case. In some embodiments, the navigation recommendation may comprise a link to the particular page on the website.

In some embodiments, the navigation recommendation module 216 may be configured to determine the type of use case by detecting a user action on the website, and determining the type of use case based on the user action. In some embodiments, the user action may comprise at least one of selecting content to view and submitting content.

In some embodiments, the navigation recommendation module 216 may be further configured to determine another type of use case for another use of the website by the user. The other type of use case may be determined amongst the plurality of types of use cases. The other type of use case may be different from the previous type of use case. Another navigation recommendation may be determined based on the other determined type of use case. The other navigation recommendation may comprise a recommendation for the user to navigate to another content on the website. The other navigation recommendation may be caused to be displayed to the user.

In some embodiments, the plurality of types of use cases may comprise at least one of viewing an update of a profile of another user, viewing an event associated with the profile of another user, performing a job search, and participating in or viewing a discussion. However, it is contemplated that other types of use cases are also within the scope of the present disclosure.

In some embodiments, the navigation recommendation module 216 may also be configured to determine the navigation recommendation based on at least one of profile information of the user, social graph data, and historical behavior data of the user, in addition to or as an alternative to basing the determination of the navigation recommendation on the determined type of use case.

The operation of the navigation recommendation module 216 is described in further detail below in connection with the description of FIGS. 3A-6.

Although not shown, with some embodiments, the social networking system 210 provides an application programming interface (API) module via which applications and services can access various data and services provided or maintained by the social networking service. For example, using an API, an application may be able to request and/or receive one or more navigation recommendations. Such applications may be browser-based applications, or may be operating system-specific. In particular, some applications may reside and execute (at least partially) on one or more mobile devices (e.g., phone, or tablet computing devices) with a mobile operating system. Furthermore, while in many cases the applications or services that leverage the API may be applications and services that are developed and maintained by the entity operating the social networking service, other than data privacy concerns, nothing prevents the API from being provided to the public or to certain third-parties under special arrangements, thereby making the navigation recommendations available to third party applications and services.

Although the navigation recommendation module 216 is referred to herein as being used in the context of a social networking service, it is contemplated that it may also be employed in the context of any website or online services. Additionally, although features of the present disclosure are referred to herein as being used or presented in the context of a web page, it is contemplated that any user interface view (e.g., a user interface on a mobile device or on desktop software) is within the scope of the present disclosure.

FIGS. 3A-3E illustrate a graphical user interface 300 in which one or more navigation recommendations may be provided, in accordance with an example embodiment. The graphical user interface 300 may display contents of a website. In some embodiments, the website is a social networking or social media website (e.g., LinkedIn, Facebook). However, it is contemplated that other types of websites are also within the scope of the present disclosure.

Figure 3A:
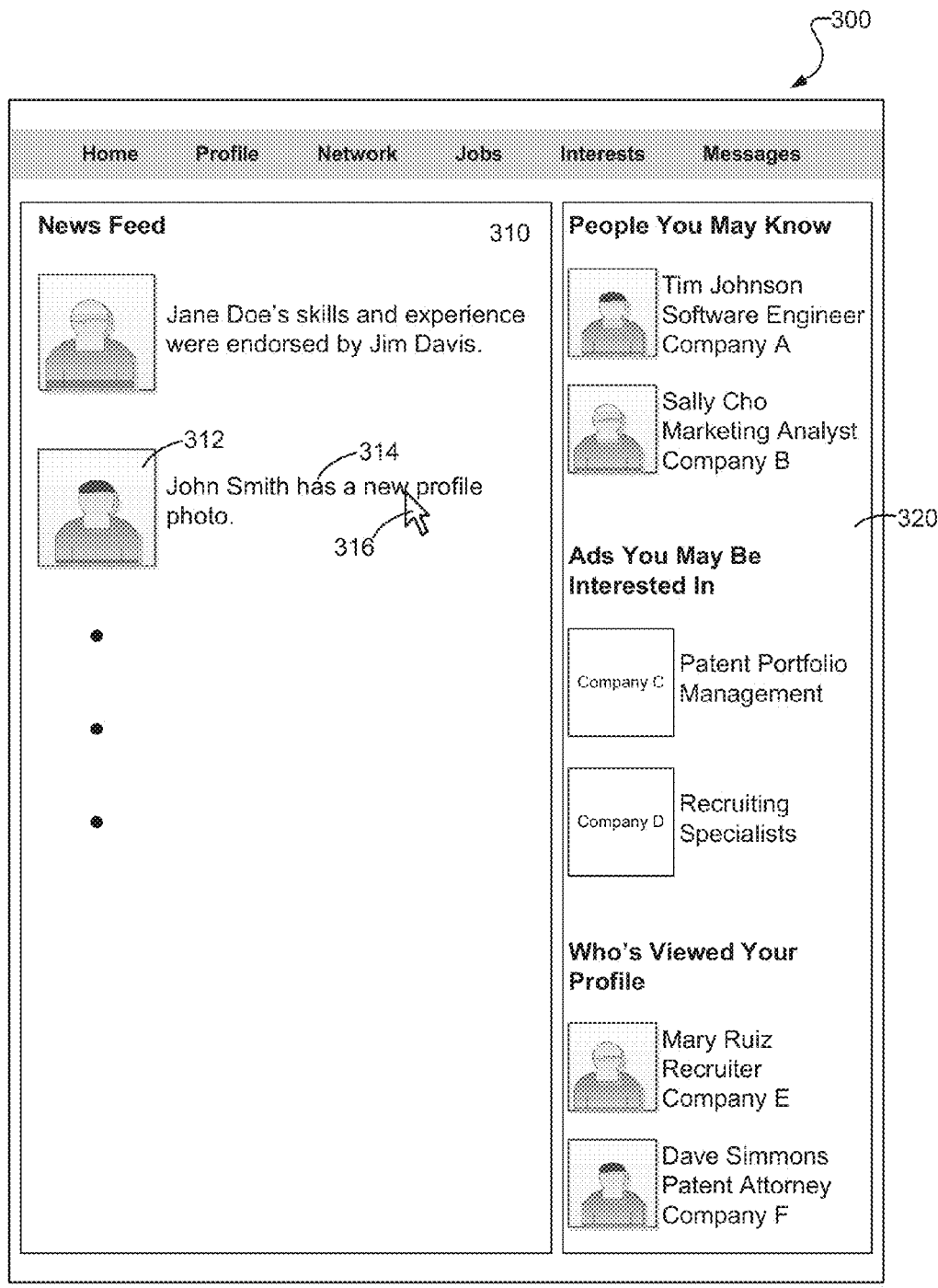
FIGS. 3A-3E illustrate a graphical user interface in which navigation recommendations are provided, in accordance with an example embodiment.

In FIG. 3A, graphical user interface 300 may display the contents of a web page on a social networking website. The page may comprise a "News Feed" section 310, which may present frequently updated content for a user/member that has logged in to the website. Such frequently updated content may include, but is not limited to, updates/changes in the profiles of other users/members of the website and events/activities related to other users/members of the website. Other types of frequently updated content are also within the scope of the present disclosure. The page may also comprise a sidebar section 320 comprising additional content, such as a list of other users that the user may know, ads that the user may be interested in, and a list of other users that have viewed the user's profile. Other types of additional content are also within the scope of the present disclosure.

The web page may comprise content that indicates a particular use case. As previously discussed, a use case may comprise a set of possible sequences of interactions between a system and users in a particular environment and related to a particular goal. In FIG. 3A, the web page may comprise an indication 314 of a use case related to viewing an update of another user's profile (e.g., viewing a new profile photo of John Smith). This indication 314 may comprise text positioned next to an image 312 of the other user. In some embodiments, the indication 314 may comprise a selectable link that causes an action in furtherance of achieving the particular goal of the user case when the link is selected. For example, in FIG. 3A, the user may click, or otherwise select, the text of the indication 314 using a pointer 316, or some other selection mechanism. In response to this user action, the user may be navigated to another page of the website or be navigated to a modified version of the same page.

Figure 3B:
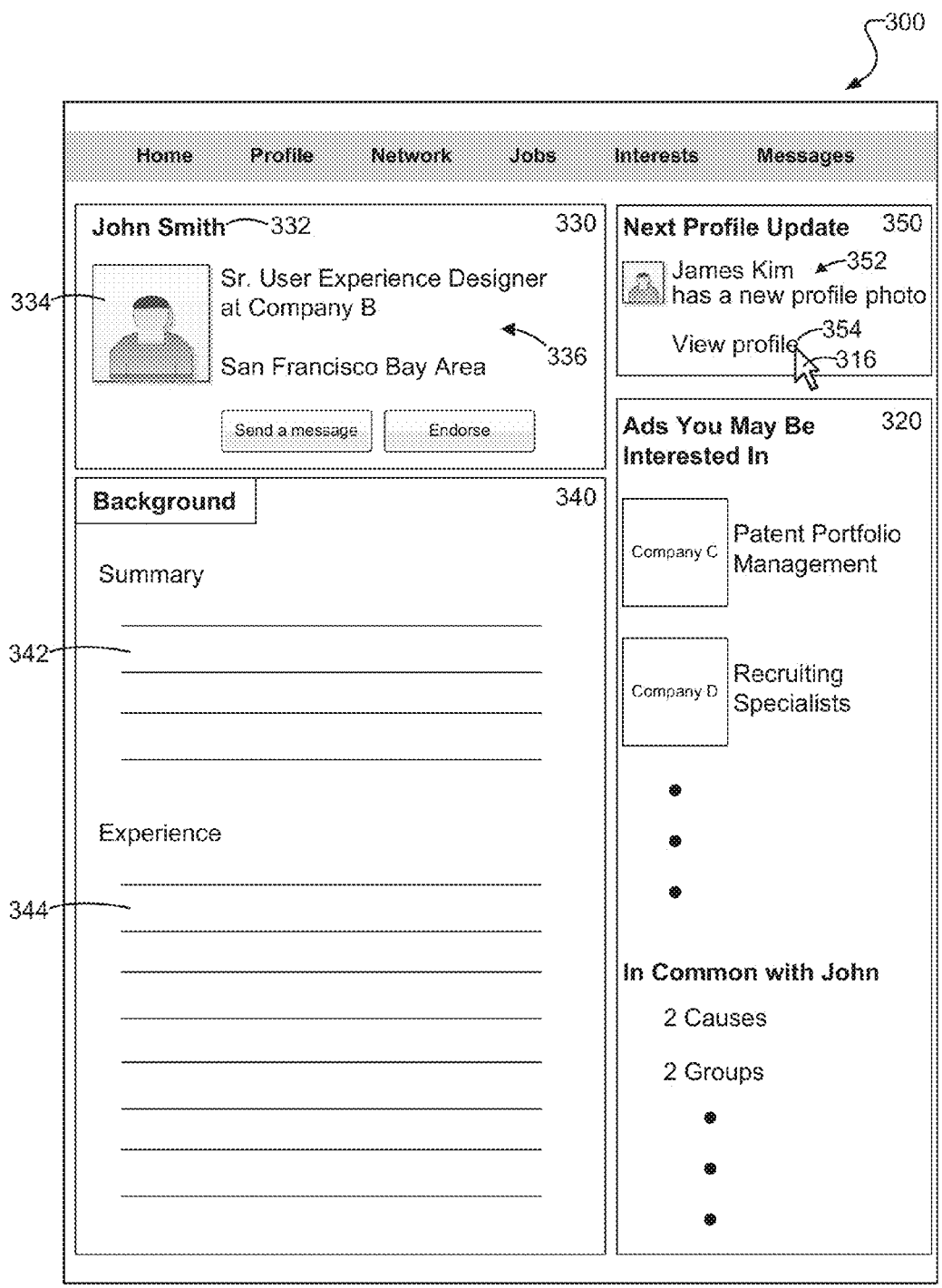

In FIG. 3B, the user has clicked the text of the indication 314 in FIG. 3A, and is navigated to the other user's profile page. The profile page may comprise a basic information section 330, which may include the name 332 of the other user, an image of the other user, and current job and location information 336 of the other user. The profile page may also comprise a background information section 340, which may include a summary information 342 that may provide a summary description of the other user, as well as experience information 344 that may provide information regarding the other user's professional experience. It is contemplated that other configurations are also within the scope of the present disclosure.

In response to the user clicking the text of the indication 314 in FIG. 3A and being navigated to the other user's profile page, a navigation recommendation may be determined and displayed to the user in a navigation recommendation section 350. In some embodiments, the navigation recommendation may be determined based on a type of use case that is determined for a use of the website by the user. For example, since the user clicked on the indication 314 of the use case related to viewing the update of John Smith's profile, the navigation recommendation module 216 may determine that the type of use case is viewing an update of another user's profile. Based on this determination, the navigation recommendation module 216 may then determine that the next relevant content that the user would likely be interested in would be an update of yet another user's profile. For example, in FIG. 3B, the navigation recommendation section 350 comprises an indication 352 of a use case related to viewing an update of another user's profile (e.g., viewing a new profile photo of James Kim), along with a selectable link 354 for navigating to a viewing of the update of the other user's profile.

Figure 3C:
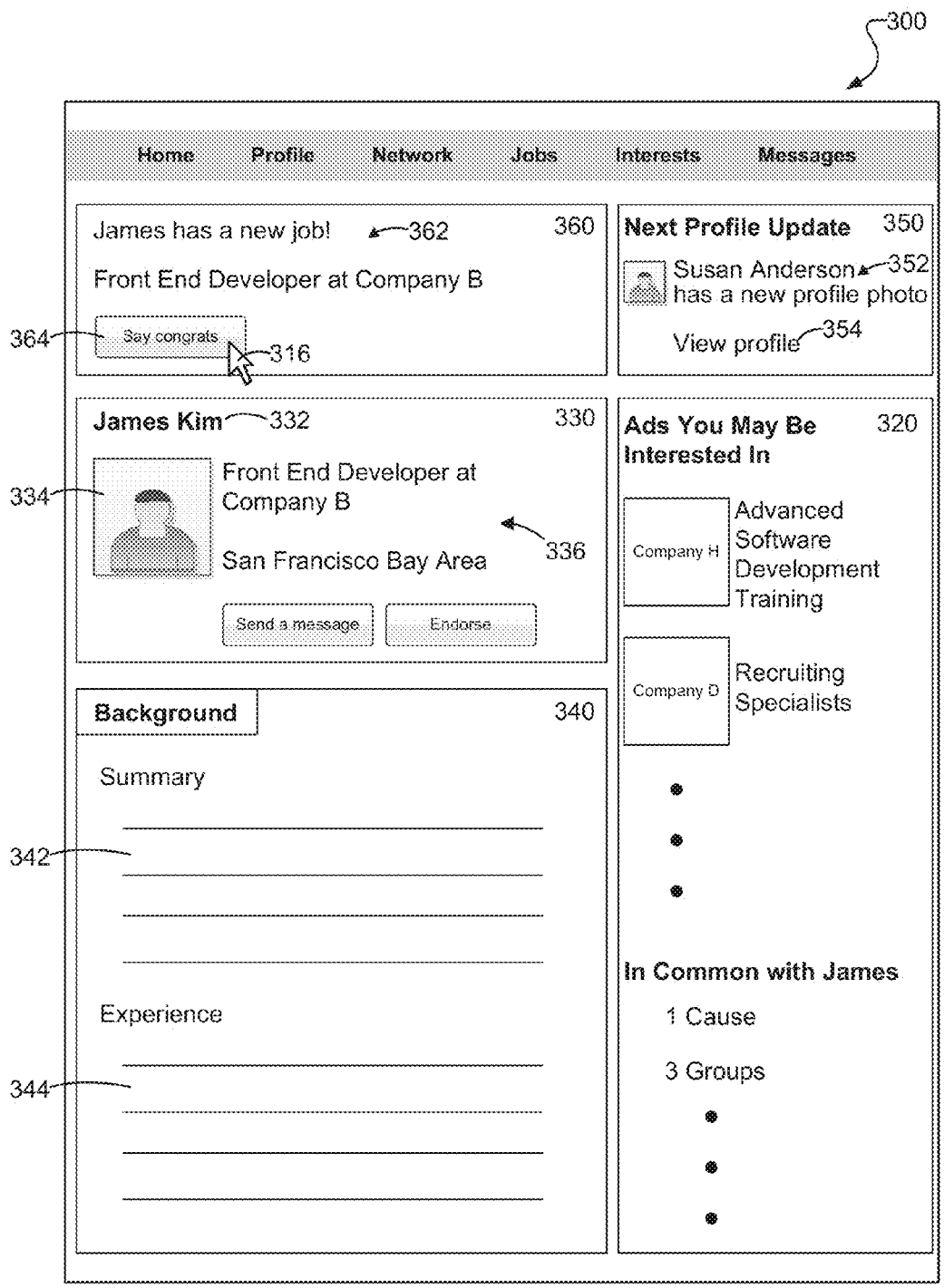

In FIG. 3C, the user has clicked the selectable link 352 in FIG. 3B, and is navigated to the next user's profile page, which, in this example, is the profile page of James Kim. In response to the user clicking the selectable link 352 in FIG. 3B and being navigated to the James Kim's profile page, another navigation recommendation may be determined and displayed to the user in the navigation recommendation section 350. Since the user selected to view James Kim's profile update, the navigation recommendation module 216 may once again determine that the type of use case is viewing an update of another user's profile based on this use of the website. Based on this determination, the navigation recommendation module 216 may then determine that the next relevant content that the user would likely be interested in would be an update of yet another user's profile. For example, in FIG. 3C, the navigation recommendation section 350 comprises an indication 352 of a use case related to viewing an update of another user's profile (e.g., viewing a new profile photo of Susan Anderson), along with a selectable link 354 for navigating to a viewing of the update of the other user's profile.

In the example of FIG. 3C, the profile page of James Kim may also comprise an event notification section 360 providing a notice of an event related to James Kim. For example, in FIG. 3C, the event notification section 360 may comprise a notice 362 that James Kim has a new job. The event notification section 360 may also comprise a selectable button 364 for enabling the user to engage in congratulating James Kim on his new job.

Figure 3D:
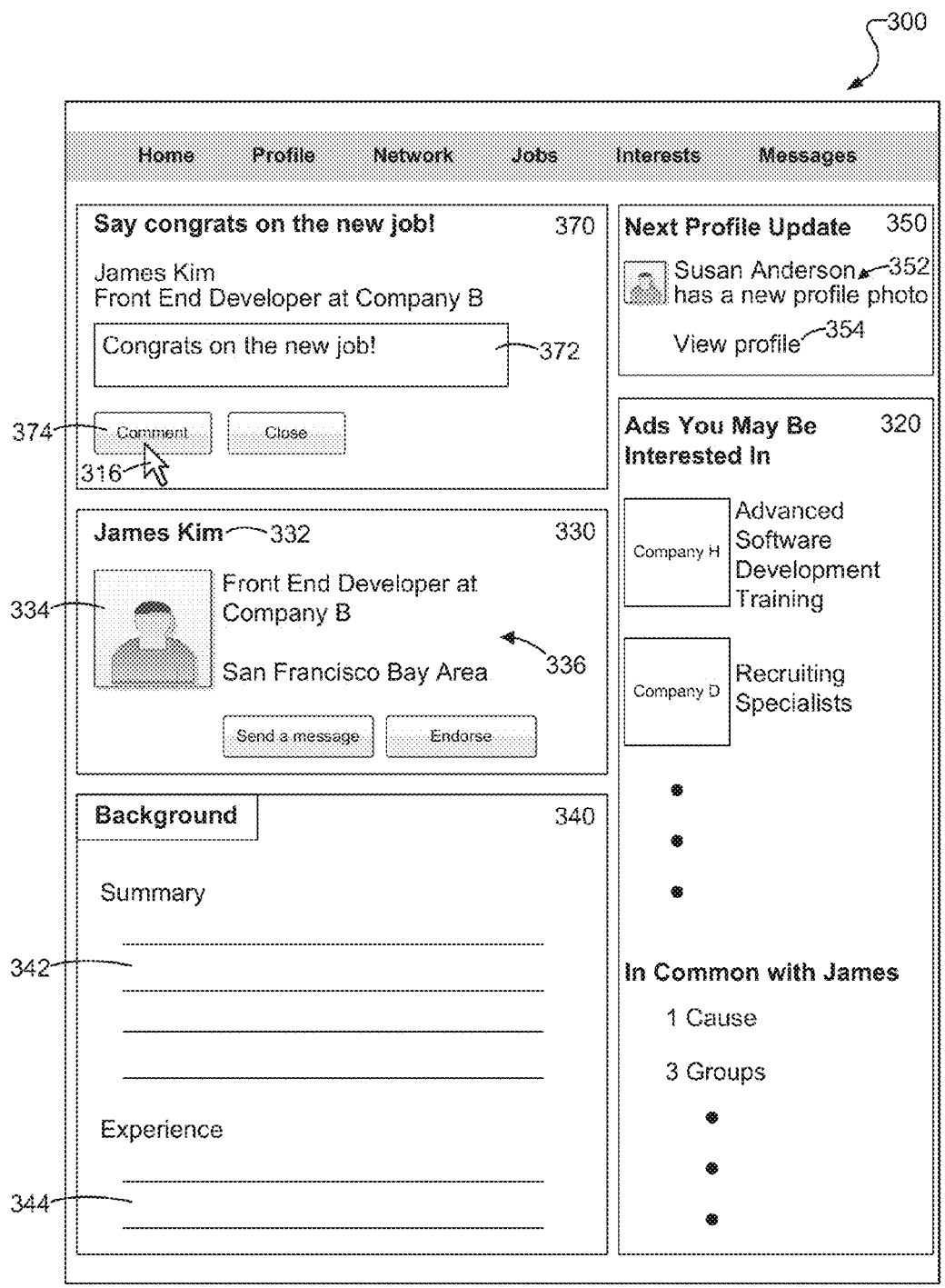

In response to the user selecting the selectable button 364, the user may be navigated to a modified version of the profile page of James Kim, which is illustrated in FIG. 3D. In FIG. 3D, the profile page of James Kim may include a congratulations section 370 that comprises a text entry box 372 for the user to enter text (e.g., "Congrats on the new job!"). In some embodiments, predetermined text may be provided in the text entry box 372 as a default without the user having to enter any text. The user may then submit the text in the text entry box 372 as a congratulatory message to James Kim by clicking, or otherwise selecting, a selectable button 374.

Figure 3E:
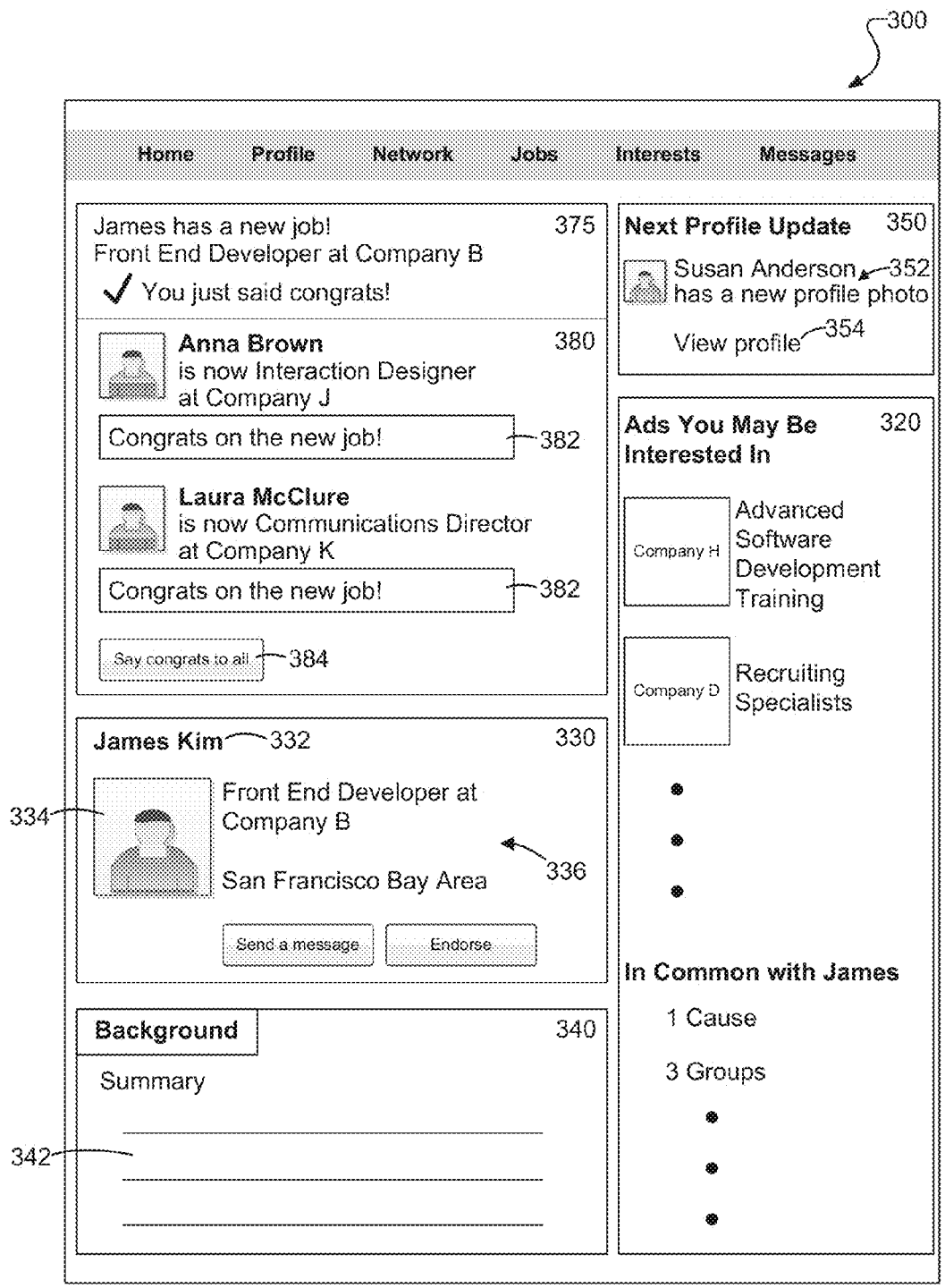

In FIG. 3E, in response to the user clicking the selectable button 374 in FIG. 3D, the user may be navigated to another modified version of the profile page of James Kim. Here, the profile page may include a congratulations confirmation section 375 comprising a confirmation of the user congratulating James Kim on his new job.

Furthermore, in response to the user clicking the selectable button 374 in FIG. 3D, and thereby submitting the congratulations message to James Kim, the navigation recommendation module 216 may determine that the user engaged in a use case of a type related to congratulating another user on a new job. The navigation recommendation module 216 may then determine and provide to the user one or more navigation recommendations based on this determination of the type of use case. For example, in FIG. 3E, the navigation recommendations may be to submit congratulations to other users (in this example, Anna Brown and Laura McClure) to congratulate them on their new respective jobs. These navigation recommendations may be displayed in section 380, and may comprise details of the new jobs of the other users, as well as text entry boxes 382 for the user to enter text (e.g., "Congrats on the new job!"). In some embodiments, predetermined text may be provided in the text entry box 382 as a default without the user having to enter any text. The user may then submit the text in the text entry box 382 as a congratulatory message to both of these other users by clicking, or otherwise selecting, a selectable button 384.

In addition to the types of use cases discussed above, other types of use cases are also within the scope of the present disclosure, including, but not limited to, performing a job search and participating in or viewing an online discussion.

Furthermore, in some embodiments, the navigation recommendations may be displayed as part of the website with which the user is engaging. In some embodiments, the navigation recommendations may be displayed as part of a browser (e.g., Chrome) in the form of a pop-up window or overlay that covers a portion of the content of the website.

Additionally, in some embodiments, the user action or input that the navigation recommendation module 216 uses to determine the type of use case and/or the navigation recommendation may be performed or provided from the website, such as in the examples provided in FIGS. 3A-3E where the user goes to the website and performs actions. In some embodiments, the user action or input that the navigation recommendation module 216 uses to determine the type of use case and/or the navigation recommendation may be performed or provided from an application separate from the website. For example, in some embodiments, the use may receive an e-mail comprising a notification of another user's profile update associated with the website. This e-mail notification may comprise a link to the profile update on the website. Upon selecting the link, the user may be brought to the profile update on the website, and the navigation recommendation module 216 may use the user's selection of this link as input in determining a type of use case and/or a navigation recommendation.

Figure 4:
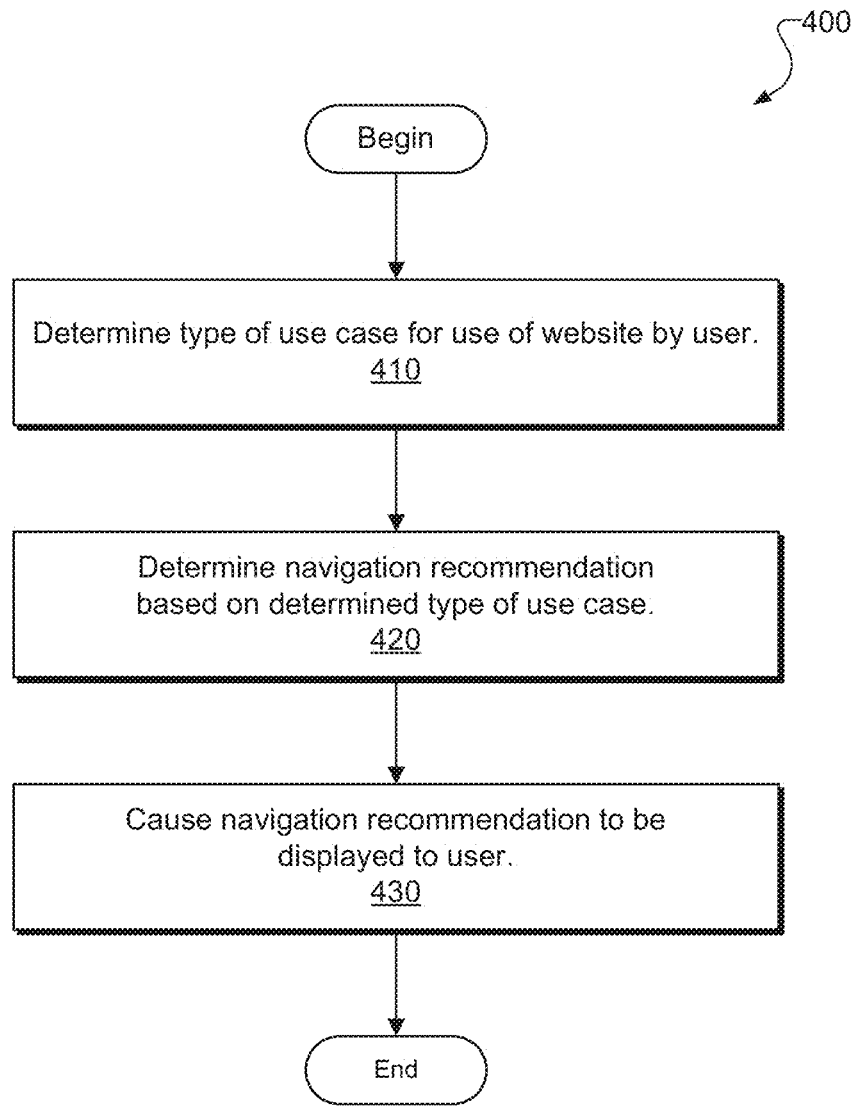
FIG. 4 is a flowchart illustrating a method of providing a navigation recommendation to a user, in accordance with an example embodiment.

FIG. 4 is a flowchart illustrating a method 400 of providing a navigation recommendation to a user, in accordance with an example embodiment. It is contemplated that the operations of method 400 may be performed by a system or modules of a system (e.g., navigation recommendation module 216 in FIG. 2).

At operation 410, a type of use case may be determined for a use of a website by a user. This use case may be one of a plurality of types of use cases for the website. In some embodiments, a user action on the website may be detected, and the type of use case may be determined based on the detected user action. For example, if the user clicks on a link to view a profile update of another user, it may be determined that the type of use case is the viewing of a profile update of another user. In another example, if the user selects a link to view a discussion, then it may be determined that the type of use case is viewing a discussion. In some embodiments, the user action may comprise selecting content to view. In some embodiments, the user action may comprise submitting content. Other types of use cases and user actions are also within the scope of the present disclosure.

At operation 420, a navigation recommendation may be determined based on the type of use case determined at operation 410. In some embodiments, a plurality of navigation recommendations may be determined based on the determined type of use case. In some embodiments, the navigation recommendation may comprise a recommendation for the user to navigate to a particular content on the website. In some embodiments, the navigation recommendation may comprise a recommendation for the user to navigate to a particular page on the website. This particular page may comprise content corresponding to the determined type of use case. In some embodiments, the navigation recommendation may comprise a link to this particular page. At operation 430, the navigation recommendation may be caused to be displayed to the user. It is contemplated that any of the other features described within the present disclosure may be incorporated into method 400.

In some embodiments, one or more navigation recommendations may be determined without a determination of a type of use case. In some embodiments, one or more navigation recommendations may be determined based on information indicating a user's intent and/or interests.

Figure 5:
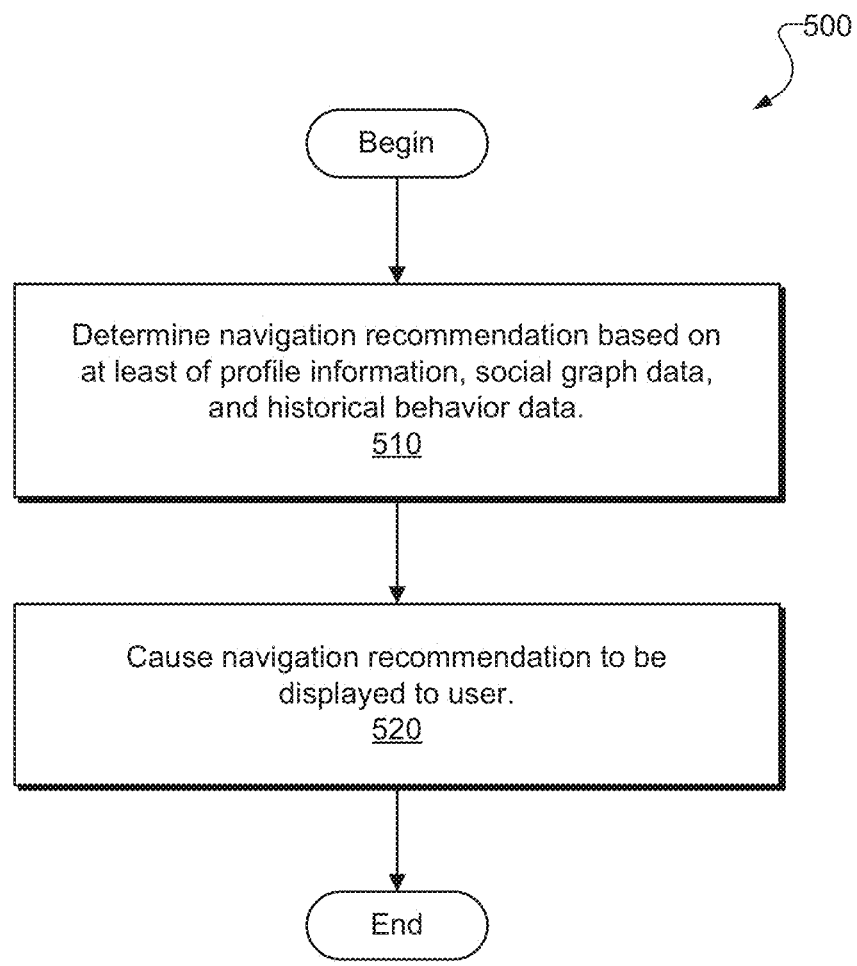
FIG. 5 is a flowchart illustrating a method of providing a navigation recommendation to a user, in accordance with another example embodiment.

FIG. 5 is a flowchart illustrating a method 500 of providing a navigation recommendation to a user, in accordance with another example embodiment. It is contemplated that the operations of method 500 may be performed by a system or modules of a system (e.g., navigation recommendation module 216 in FIG. 2).

At operation 510, one or more navigation recommendations may be determined based on at least one of profile information of the user for which the navigation recommendation is being made (e.g., the user to whom the navigation recommendation will be provided), social graph data, and historical behavior data.

At operation 520, the navigation recommendation may be caused to be displayed to the user. It is contemplated that any of the other features described within the present disclosure may be incorporated into method 500.

In some embodiments, one or more navigation recommendations may be determined using a determination of a type of use case, in addition to information indicating a user's intent and/or interests.

Figure 6:
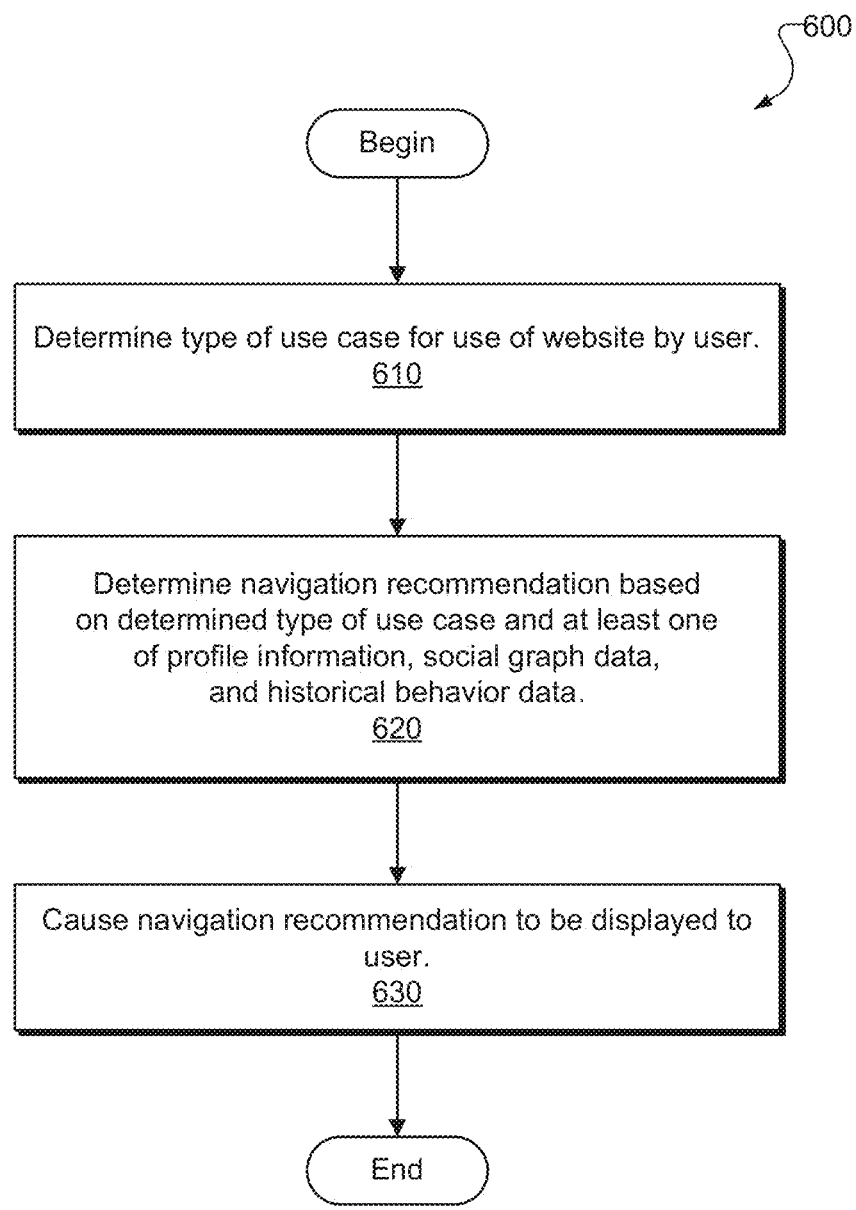
FIG. 6 is a flowchart illustrating a method of providing a navigation recommendation to a user, in accordance with yet another example embodiment.

FIG. 6 is a flowchart illustrating a method 600 of providing a navigation recommendation to a user, in accordance with yet another example embodiment. It is contemplated that the operations of method 600 may be performed by a system or modules of a system (e.g., navigation recommendation module 216 in FIG. 2).

At operation 610, a type of use case may be determined for a use of a website by a user. This use case may be one of a plurality of types of use cases for the website. In some embodiments, a user action on the website may be detected, and the type of use case may be determined based on the detected user action. In some embodiments, the user action may comprise selecting content to view. In some embodiments, the user action may comprise submitting content. Other types of user actions are also within the scope of the present disclosure.

At operation 620, a navigation recommendation may be determined based on the type of use case determined at operation 610, as well as on at least one of profile information of the user for which the navigation recommendation is being made (e.g., the user to whom the navigation recommendation will be provided), social graph data, and historical behavior data. In some embodiments, the navigation recommendation may comprise a recommendation for the user to navigate to a particular content on the website. In some embodiments, the navigation recommendation may comprise a recommendation for the user to navigate to a particular page on the website. This particular page may comprise content corresponding to the determined type of use case. In some embodiments, the navigation recommendation may comprise a link to this particular page. At operation 630, the navigation recommendation may be caused to be displayed to the user. It is contemplated that any of the other features described within the present disclosure may be incorporated into method 600.

In some embodiments, the information indicating a user's intent and/or interests may comprise quantitative scores. These intent and interest scores may be determined for a user of a website and then be made available to a wide variety of applications and services, thereby enabling those applications and services to be personalized for the user based on the user's various scores. In some embodiments, the intent and interest score(s) may be used to determine one or more navigation recommendations.

Some embodiments of generating and using intent and interest scores are disclosed in U.S. patent application Ser. No. 13/931,471, filed Jun. 28, 2013, entitled "TECHNIQUES FOR QUANTIFYING THE INTENT AND INTERESTS OF MEMBERS OF A SOCIAL NETWORKING SERVICE," which is hereby incorporated by reference in its entirety as if set forth herein. In some embodiments, the navigation recommendation module 216 may employ the techniques of generating and using intent and interest scores disclosed therein in generating the navigation recommendations of the present disclosure. Some of these techniques are discussed in further detail below.

In some embodiments, an intent and interest score-generating module (or simply "score-generating module"), that uses a variety of input data (e.g., member profile data, social graph data, and member-activity or behavioral data) may derive various member-intent and member-interest scores for members of the social networking service. In some embodiments, the score-generating module and its functions may be incorporated into the navigation recommendation module 216. In some embodiments, the score generating module may be separate from the navigation recommendation module 216 and the scores it generates may be received and used by the navigation recommendation module 216.

In general, a member-intent score is a measure of a member's attitude or desire for certain activities, while a member-interest score represents a more granular level of insight into a particular intent of the member. For example, consider a scenario where a particular member of a social networking service is frequently browsing and searching for various job listings that have been posted to a job listing service provided by, or otherwise associated and integrated with, the social networking service. Based on analysis of the particular member's profile and analysis of the particular member's activities and behavior—that is, how the member has interacted with the various applications and services of the social networking service—the particular member may be assigned a high job-seeker intent score. If the job listings that the member has been browsing and searching for are job listings for jobs in the financial services industry and the information technology industry, then the member may be assigned high member-interest scores for these two particular interests—that is, financial services and information technology. Accordingly, the interest scores capture a more granular level of insight into the particular interests of a member, as those interests relate to a particular intent. Consistent with some embodiments, the score-generating module may be designed as an open framework that easily allows integration of different models and algorithms for computing the various intent and interest scores, thereby making it easy for developers to add new models, revise existing models, and perform various tests (e.g., A/B testing) on different versions of similar models.

In the examples provided below, the specific intent types, as well as the various interest types or categories, may be particularly relevant with respect to a social networking service that is aimed at serving career-oriented members and professionals. However, skilled artisans will readily recognize the general applicability of the subject matter of the present disclosure to a wide variety of different types of social networking services, and related applications and services. Moreover, the subject matter of the present disclosure is applicable in a variety of applications beyond social networking services.

Figures 7A, 7B:
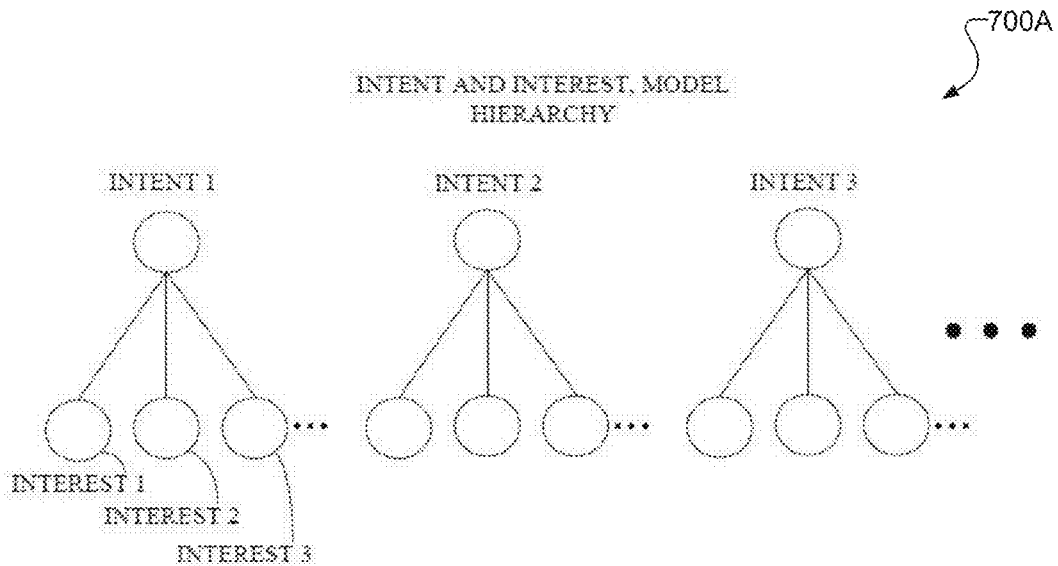
FIG. 7A is a diagram illustrating an example of a hierarchical model for modelling a member's intent and interests, in accordance with an example embodiment.
FIG. 7B is a diagram illustrating an example of a member matrix for representing various measures of a member's intent and interests, in accordance with an example embodiment.

In some embodiments, the score-generating module may derive or generate for each member of the social networking service an intent score for each of several intent types or categories. For example, as illustrated in the intent and interest model hierarchy 700A presented in FIG. 7A, each of the model entities labelled respectively as "INTENT 1", "INTENT 2", and "INTENT 3" may represent a different intent type or category. The intent score for each intent type or category is derived using a different algorithm, model or technique, including a unique combination of data inputs. In the context of a professional networking service, these different intent types may include, but certainly are not limited to, the following. A job-seeker intent score may be representative of a member's propensity to change jobs. Accordingly, the job-seeker intent score may indicate a measure of how likely the member is to engage with various applications, services and content that facilitate changing jobs (e.g., such as a job listing service). A recruiter intent score may be representative of a member's propensity to recruit members of the social networking service for various employment positions. Accordingly, the recruiter intent score may indicate a measure of how likely the member is to engage with various applications, services and content that relate to, or otherwise facilitate the recruiting of other members. A talent professional intent score may represent a measure of how likely a member is to subscribe to a particular subscription offering of the social networking service. A content consumer intent score may represent a measure of how likely the member is to consume (e.g., search for, view, and browse) content (e.g., news articles, white papers, blog postings, etc.) published via the social networking service, or some other content provider. Finally, a connector intent score may represent a measure of how likely a member is to connect with other members via the social networking service. With some embodiments, for each member-intent score, several member-interest scores are possible, for different interest types or categories. Accordingly, as shown in FIG. 7B, for a particular member-interest, the various interest scores may be represented as an interest vector. Accordingly, for several different member-intent scores, the various scores can be represented as a member interest and intent matrix 700B, such as the example shown in FIG. 7B.

Referring again to FIG. 7A, for each different type or category of intent, one or more interest scores may be provided, such as the model entities labelled as "INTEREST 1", "INTEREST 2", and "INTEREST 3". The interest scores for each interest type or category provide a measure at a more granular level of insight into the particular interest that each member has with respect to a particular intent type or category. For example, if a particular member has a high member-intent score for the intent type of "job-seeker," and a high member-interest score for the interest type of "software engineering," there is a high likelihood that the member is interested in software engineering jobs. As such, the combination of an intent and interest score can provide detailed information about a member's application, service and content preferences. For instance, continuing with the example, when the particular member is presented with a landing or home page for the social networking service, because of his high job-seeker intent score, it would make sense to position a content module for an application or service relating to the job search function in a prominent position on the page. Moreover, because the member's interest score for software engineering is high, the content presented within the particular job search content module may be tailored to present to the particular member one or more job listings specifically related to software engineering positions. Accordingly, a member's intent and interest scores can be used in a process for selecting various content modules for different applications and services to present to a user. Furthermore, the individual application and service modules can personalize an experience for a member, for example, by selecting content to present based on intent and interest scores. For example, a content recommendation algorithm may leverage the intent and interest scores to select news articles and other content for presentation to a member. Similarly, a relevance or ranking algorithm of a search engine may provide personalized search results by ordering a set of search results based at least in part on how the search results relate to a member's intent and interest scores.

Generally, the input data with which the score-generating module determines or derives the member-intent and member-interest scores can be classified as being one of three different types of data. First, the data may be what is referred to as member profile data. Member profile data is personal data associated with a specific member (e.g., a registered user) of the social networking service, and is in essence a digital representation of a person's identity. Accordingly, member profile data typically consists of biographical information, including a person's name, birthdate, age, geographical location of residence, and so forth. With some social networking services, member profile data may also include a variety of education and career-oriented information commonly found in a resume or curriculum vitae.

With some embodiments, member profile data includes not only the information that is explicitly provided by a member, but also a number of derived or computed attributes or components.

Another type of data that is available to the score-generating module for use as input data and from which the score-generating module can determine or derive the various intent and interest scores is referred to generally as social graph data. Generally, social graph data is data identifying or otherwise indicating the relationships and associations that a member has with other members, and other entities (e.g., companies, schools, groups, etc.) represented in a social graph maintained by the social networking service. For example, consistent with some embodiments, a social graph is implemented with a specialized graph data structure in which various entities (e.g., people, companies, schools, government institutions, non-profits, and other organizations) are represented as nodes connected by edges, where the edges have different types representing the various associations and/or relationships between the different entities. Although other techniques may be used, with some embodiments the social graph data structure is implemented with a special type of database known as a graph database. Accordingly, if a member is employed at a particular company, this particular association will be reflected in the social graph. Similarly, when a member joins a particular online group hosted by the social networking service, or hosted by a third-party service provider, the member's membership in the group may be reflected in the social graph data.

Analysis of social graph data may signal a member's intentions, and therefore may be used to derive a score representing a particular type of intent for a member. For instance, with some embodiments, by analyzing certain social graph data, the score-generating module can identify certain signals that are highly suggestive of active job-seeking activity.

With some embodiments, the number of connections that a member has may provide some insight into the likelihood that the member will establish new connections, and thus be useful in representing a connector intent score.

Finally, a third type of input data that may be used by the score-generating module to determine the intent and interest scores for a member is data referred to herein as member-activity and/or behavioral data. Member-activity and behavioral data is data obtained by monitoring and tracking the interactions that a member has with various applications, services and/or content that are provided by, or, integrated or otherwise associated with, the social networking service.

By detecting how and when members interact with such applications and services, relevant data signals can be inferred from the data and used as input to the score-generating module in deriving one or more intent scores, and/or interest scores.

The intent and interest score-generating module may receive, as input, data from any one or more of the databases 218, 220 and 222, and computes or derives for each member of the social networking service a set of intent and interest scores. With some embodiments, the scores are generated periodically, based on some predefined schedule. Alternatively, with some embodiments, the scores for a member may be generated in real-time, for example, responsive to a request to generate the scores for the member. With some embodiments, one or more intent scores or interest scores may be based in part on the number of times that a particular member performed some specific action within a particular range of time. However, in some instances, certain data used in deriving an intent or interest score may be subject to a time decay algorithm, such that the contribution of the particular data element to any particular score may depend on the time when the data was generated—or more precisely, the time when a user took some particular action.

In some embodiments, a score-generating module analyzes one or more of a member's profile data, social graph data, and historical activity data to derive a set of member-intent scores and member-interest scores. Each intent score and each interest score may be derived based on its own algorithm specifying a combination of input data for deriving the intent or interest score. Accordingly, the score-generating module may compute any number of intent scores with associated interest scores. With some embodiments, the intent and interest scores are derived as a weighted combination of the count of certain user-initiated activities or behaviors that have been detected and logged, where the count is subject to some timing parameters. For example, the contribution of any given activity to the overall score may depend on when that activity occurred, such that, generally, activities having occurred in the distant past will contribute less to an overall score than similar activities that have recently been detected. With some embodiments, the weighting factors for any particular detected activity or behavior may be established via a supervised machine learning algorithm.

Once derived, the set of intent and interest scores may be stored in association with a member identifier of a member. Finally, the scores may be made available to any number and variety of applications and services, enabling those applications and services to personalize a user experience, particularly the presentation (selection, arrangement, format, and so forth) of various user interface elements, based on the member's intent and interest scores. For example, the navigation recommendation module 216 may use these scores to determine and provide navigation recommendations to users.

In some embodiments, several user interface elements may be selected based on various member-intent and interest scores. For instance, one or more content items may be selected from a large number of content items for presentation to the member. Similarly, the ordering of the content items in an activity or content stream may be based in part on one or more intent and/or interest scores.

The features of the present disclosure provide many optimization functions. First, the features increase user engagement, promoting continuous browsing by a user, and optimizing session depth and page views. Second, the features increase user on-boarding, enhancing the capture of users' intentions to serve better value to the users in the near future. Third, the features increase user awareness, improving the introduction of new features to users.

It is contemplated that the features of the present disclosure may be applied to the following uses cases: addition or recommendation of entities (e.g., person, company, group) as connections or leads, addition or recommendation of address book importation, selection or recommendation of content (e.g., new new influencer's post, connection's status update, company's status update).

In one example, a user may be sent an e-mail that comprises an indication of a new connection. For example, the e-mail may include a link reading "View my new connection's profile." The user may select the link and be taken to the profile page of the new connection. There, based on the detected use case, profile information of the user, and/or historical behavior data of the user, the user may be presented with a notification of people or other entities the user may know and want to be connected with.

In another example, a user may be performing a job search, and then be presented with the option of viewing a recruiter's profile. The user may select to view the recruiter's profile, and then be presented with a membership upsell (e.g., Job Seeker premium upsell).

In yet another example, a user may be performing a job search, and then be presented with the option of viewing a company page and/or be prompted to follow the company.

In yet another example, a user may be viewing a group discussion page, and then be presented with a notification of groups the user may want to join.

In yet another example, a user may be viewing the post page of an influencer that the user is following, and then be notified of the post page of an influencer that the user is not following. The user may then be prompted to follow the influencer that he or she is not currently following.

In yet another example, a user may be viewing the post page of an influencer, and then be presented with one or more channels that the user may want to follow.

Other use cases are also within the scope of the present disclosure.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 8:
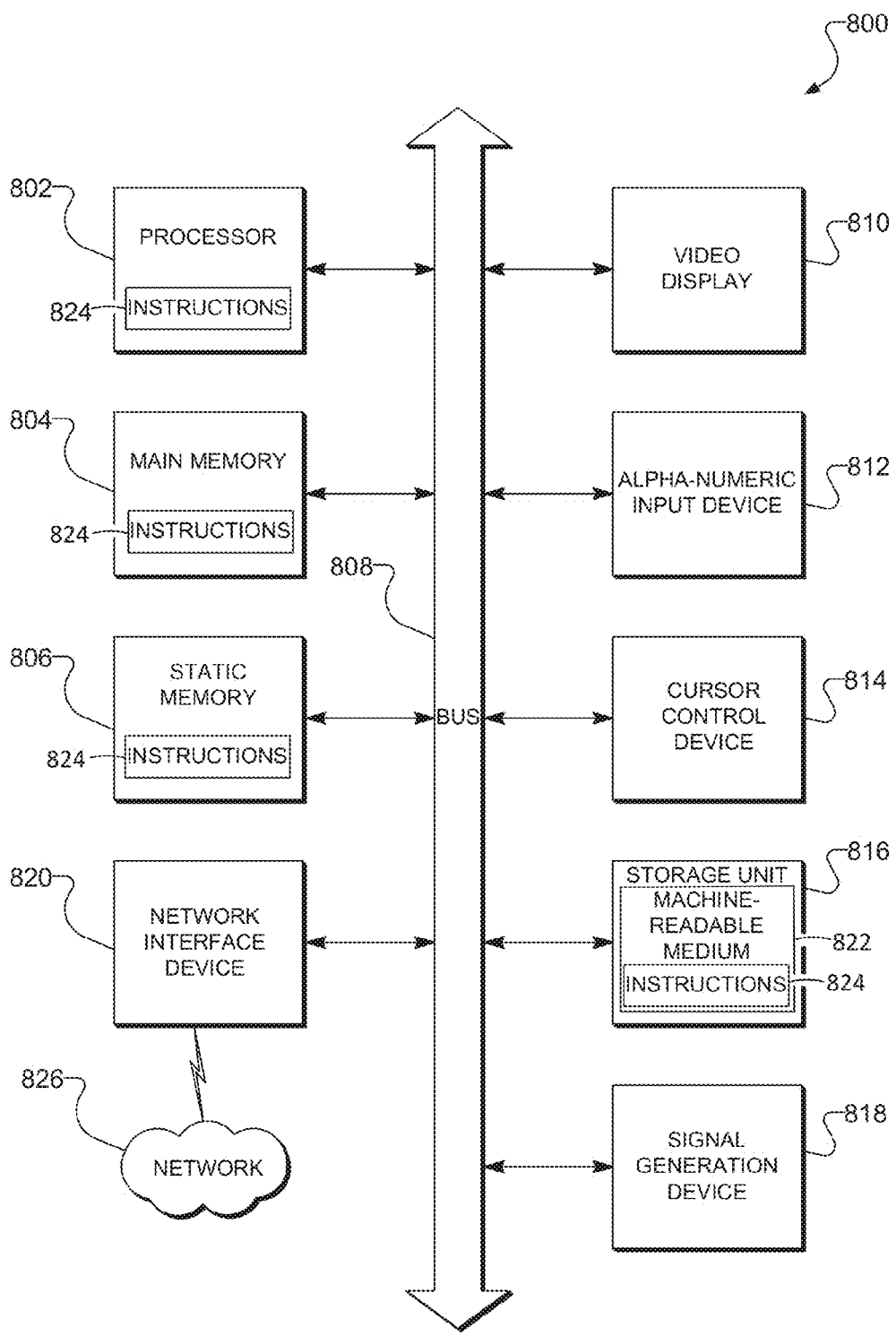
FIG. 8 is a block diagram of an example computer system on which methodologies described herein may be executed, in accordance with an example embodiment.

FIG. 8 is a block diagram of an example computer system 800 on which methodologies described herein may be executed, in accordance with an example embodiment. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard or a touch-sensitive display screen), a user interface (UI) navigation device 814 (e.g., a mouse), a disk drive unit 816, a signal generation device 818 (e.g., a speaker) and a network interface device 820.

Machine-Readable Medium

The disk drive unit 816 includes a machine-readable medium 822 on which is stored one or more sets of instructions and data structures (e.g., software) 824 embodying or utilized by any one or more of the methodologies or functions described herein. The instructions 824 may also reside, completely or at least partially, within the main memory 804 and/or within the processor 802 during execution thereof by the computer system 800, the main memory 804 and the processor 802 also constituting machine-readable media.

While the machine-readable medium 822 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 824 may further be transmitted or received over a communications network 826 using a transmission medium. The instructions 824 may be transmitted using the network interface device 820 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
   detecting a first user action on a first page of a website, the first user action comprising a selection by a first user to view an update of a profile of a second user;
   determining a first type of use case for a first use of the website by the first user, the first type of use case being determined amongst a plurality of types of use cases and based on the detected first user action on the first page, and the first type of use case comprising viewing an update of a profile of another user;
   determining, by a machine having a memory and at least one processor, a first navigation recommendation to be displayed on a second page of the website based on the determined first type of use case, the first navigation recommendation comprising a recommendation for the first user to navigate to a third page of the website, the first page, second page, and third page each being distinct from one another, the second page and the third page each comprising content corresponding to the first type of use case, the content corresponding to the first type of use case on the second page corresponding to a different user than the content corresponding to the first type of use case on the third page, the content corresponding to the first type of use case on the second page comprising the update of the profile of the second user, and the content corresponding to the first type of use case on the third page comprising an update of a profile of a third user;
   causing the first navigation recommendation to be displayed to the first user on the second page of the website in response to the first user action on the first page; and
   causing a second navigation recommendation based on the determined first type of use case to be displayed to the first user on the third page of the website in response to a second user action on the second page to view the update of the profile of the third user.

2. The method of claim 1, wherein the first navigation recommendation comprises a link to the third page of the website.

3. The method of claim 1, wherein the method further comprises:
   determining a second type of use case for a second use of the website by the first user, the second type of use case being determined amongst the plurality of types of use cases, and the second type of use case being different from the first type of use case;
   determining a third navigation recommendation based on the determined second type of use case, the third navigation recommendation comprising a recommendation for the first user to navigate to a fourth page of the website; and
   causing the third navigation recommendation to be displayed to the first user.

4. The method of claim 1, wherein the plurality of types of use cases comprise at least one of viewing an update of a profile of another user, viewing an event associated with the profile of another user, performing a job search, and participating in or viewing a discussion.

5. The method of claim 1, wherein the determination of the first navigation recommendation is further based on at least one of profile information of the first user, social graph data, and historical behavior data of the first user.

6. The method of claim 1, further comprising:
   determining a fourth navigation recommendation based on at least one of profile information of the first user, social graph data, and historical behavior data of the first user, the fourth navigation recommendation comprising a recommendation for the first user to navigate to a fourth page of the website; and
   causing the fourth navigation recommendation to be displayed to the first user.

7. A system comprising:
   a memory;
   at least one processor coupled to the memory; and
   a navigation recommendation module, executable by the at least one processor, configured to:
      detect a first user action on a first page of a website, the first user action comprising a selection by a first user to view an update of a profile of a second user;
      determine a first type of use case for a first use of the website by the first user, the first type of use case being determined amongst a plurality of types of use cases and based on the detected first user action on the first page, and the first type of use case comprising viewing an update of a profile of another user;
      determine a first navigation recommendation to be displayed on a second page of the website based on the determined first type of use case, the first navigation recommendation comprising a recommendation for the first user to navigate to a third page of the website, the first page, second page, and third page each being distinct from one another, the second page and the third page each comprising content corresponding to the first type of use case, the content corresponding to the first type of use case on the second page corresponding to a different user than the content corresponding to the first type of use case on the third page, the content corresponding to the first type of use case on the second page comprising the update of the profile of the second user, and the content corresponding to the first type of use case on the third page comprising an update of a profile of a third user;
      cause the first navigation recommendation to be displayed to the first user on the second page of the website in response to the user action on the first page; and
      cause a second navigation recommendation based on the determined first type of use case to be displayed to the first user on the third page of the website in response to a second user action on the second page to view the update of the profile of the third user.

8. The system of claim 7, wherein the first navigation recommendation comprises a link to the third page of the website.

9. The system of claim 7, wherein the navigation recommendation module is further configured to:
- determine a second type of use case for a second use of the website by the first user, the second type of use case being determined amongst the plurality of types of use cases, and the second type of use case being different from the first type of use case;
- determine a third navigation recommendation based on the determined second type of use case, the third navigation recommendation comprising a recommendation for the first user to navigate to a fourth page of the website; and
- cause the third navigation recommendation to be displayed to the first user.

10. The system of claim 7, wherein the determination of the first navigation recommendation is further based on at least one of profile information of the first user, social graph data, and historical behavior data of the first user.

11. The system of claim 7, wherein the navigation determination module is further configured to:
- determine a fourth navigation recommendation based on at least one of profile information of the first user, social graph data, and historical behavior data of the first user, the fourth navigation recommendation comprising a recommendation for the first user to navigate to a fourth page of the website; and
- cause the fourth navigation recommendation to be displayed to the first user.

12. A non-transitory machine-readable medium embodying a set of instructions that, when executed by a processor, cause the processor to perform operations, the operations comprising:
- detecting a first user action on a first page of a website, the first user action comprising a selection by a first user to view an update of a profile of a second user;
- determining a first type of use case for a first use of a website by the first user, the first type of use case being determined amongst a plurality of types of use cases and based on the detected first user action on the first page, and the first type of use case comprising viewing an update of a profile of another user;
- determining a first navigation recommendation to be displayed on a second page of the website based on the determined first type of use case, the first navigation recommendation comprising a recommendation for the first user to navigate to a third page of the website, the first page, second page, and third page each being distinct from one another, the second page and the third page each comprising content corresponding to the first type of use case, the content corresponding to the first type of use case on the second page corresponding to a different user than the content corresponding to the first type of use case on the third page, the content corresponding to the first type of use case on the second page comprising the update of the profile of the second user, and the content corresponding to the first type of use case on the third page comprising an update of a profile of a third user;
- causing the first navigation recommendation to be displayed to the first user on the second page of the website in response to the first user action on the first page; and
- causing a second navigation recommendation based on the determined first type of use case to be displayed to the first user on the third page of the website in response to a second user action on the second page to view the update of the profile of the third user.

* * * * *